Figures 1, 2:
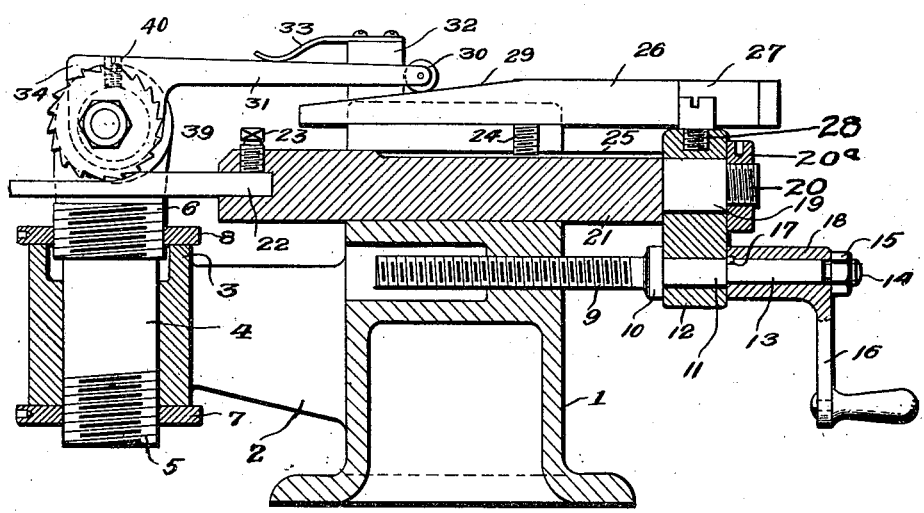

May 1, 1923.

J. E. BERGSTRÖM

MILLING MACHINE

Filed Jan. 24, 1921

1,453,654

Inventor:
Johan Erik Bergström
By
B. Singer. Atty.

Patented May 1, 1923.

1,453,654

UNITED STATES PATENT OFFICE.

JOHAN ERIK BERGSTRÖM, OF CHRISTIANIA, NORWAY, ASSIGNOR TO GUSTAF STAHLE, OF STOCKHOLM, SWEDEN.

MILLING MACHINE.

Application filed January 24, 1921. Serial No. 439,670.

*To all whom it may concern:*

Be it known that I, JOHAN ERIK BERGSTRÖM, a subject of the King of Norway, residing at 75 Waldemar Thranesgate, Christiania, Norway, have invented certain new and useful Improvements in Milling Machines (for which I have filed application for patent in Norway, January 8, 1920), of which the following is a specification.

The invention relates to improvements in milling-machines and especially machines for milling "facon"-pieces, "facon"-grooves and the like.

In order that the invention may easily be understood reference is made to the accompanying drawings in which is illustrated an embodiment of my invention, Fig. 1 showing a side view of the machine, partly in longitudinal section and Fig. 2 being a plan view of the bearing of the cutter-spindle showing the different parts in another position from that shown in Fig. 1.

1 is the frame, 2 is an arm which supports the bearing sleeve of the cutter-spindle, the arm 2 being for this purpose provided with a cylindrical head 3 having an axial vertical bore which is adapted to receive a supporting means 4, which is provided with threads 5 and 6, to receive nuts 7 and 8. The diameter of the thread 6 is conveniently made somewhat bigger than the diameter of the thread 5. Obviously by loosening the nut 7 and screwing the nut 8 in one direction or other it is possible to adjust the supporting part 4 to the desired height and keep it there by thus tightening the nut 7.

In the frame 1 is a feeding screw 9. This screw has a shoulder 10 and outside this a pivot 11, which is easily turnable in a head 12. The pivot 11 has an extension 13, at the outer end of which is a threaded portion 14 to receive a nut 15. The extension 13 serves to receive the hub 18 of a handle 16 which is used for turning the feeding screw 9 and has a lug or a pin 17, which enters a corresponding notch in the hub. The head 12 is by means of a pivot 19 having a threaded extension 20, which supports a nut 20ª connected to a slide 21 which is guided in the frame 1 and serves to support the work piece 22. The fastening of the work piece to the slide may be done by means of a pin-screw 23. The section of the slide 21 is circular and said slide may be guided by means of a screw bolt 24, which moves in a guiding groove 25 in the slide.

26 is a copying rule which is guided in the frame. The copying rule has a slot 27 which engages the head of a pin-screw 28, which is fastened in the part 12. During the feeding motion the pin-screw-head is in contact with the front part of the slot 27 and during the backward motion with its rear part. Hence there is obtained an especially desirable dead-motion between the slide 21 and the guiding rule 26 during the motion of the slide to and from the working-position. A roll 30 bears on the guiding plane 29 of the copying rule and is mounted on an arm 31 which is guided between arms 32 in the frame, contact between the roll 30 and the guiding frame 29 being secured by means of a spring 33.

The arm 31 ends in a head 34 which receives a bearing sleeve 35 in which the cutter-spindle is excentrically supported. On the sleeve 35 and between nuts 37 and 38 is fastened a guiding sleeve 39 adapted to rest on the supporting part 4. The connection between the head 34 and the sleeve 35 is secured by a pin screw 40. The sleeve 35 supports the cutter-spindle and to one end of the same is fastened the pulley 41 while in the other end is fastened a suitable cutter 42 bearing against a shoulder 43.

The operation of the machine is easily understood:

The working of the material takes place during the motion of the same to the left (Fig. 1) the desired angular motion being imparted by means of the groove 25. The cutter will cut into the material before the copying rule will take effect, but as soon as the head of the screw 28 strikes the end of the slot 27 the copying rule 26 with the guiding plane 29 will strike the roll 30 and thereby turn the bearing sleeve 35 with the guiding sleeve 39 so that the cutter spindle is lowered and a sloping surface or a groove is milled at a fixed constant or variable angle to the horizontal.

It will be understood that the construction may be varied in many ways with regard to details within the scope of the appended claims.

Having thus described my invention, what I claim is:

1. In a milling machine of the class described, a support, a sleeve mounted in a bearing of the support and provided with an eccentric bore, a spindle mounted in said bore and provided with driving means and also with a milling cutter, a work holder, a support therefor on which the work holder is mounted for sliding movement, means to actuate the work holder, and means, including an element having limited movement with the work holder, to partly turn the said sleeve and thereby vertically adjust the spindle and cutter as the work holder advances.

2. In a mailing machine of the class described, a support, a sleeve mounted in a bearing of the support and provided with an eccentric bore, a spindle mounted in said bore and provided with driving means and also with a milling cutter, a work holder, a support therefor on which the work holder is mounted for sliding movement, means to actuate the work holder, an element having limited movement with the work holder and provided with an inclined cam surface, and an arm attached to said sleeve and bearing on said cam surface, to partly turn the said sleeve and thereby vertically adjust the spindle and cutter as the work holder advances.

In testimony whereof I affix my signature in presence of two witnesses.

JOHAN ERIK BERGSTRÖM.

Witnesses:
S. SWENSON,
ELIN WAHMAN.